United States Patent [19]

Bougis

[11] Patent Number: 5,416,810
[45] Date of Patent: May 16, 1995

[54] INTERNAL EQUIPMENT FOR A NUCLEAR REACTOR HAVING CONTROL CLUSTER GUIDES

[75] Inventor: Jean-Claude Bougis, Courbevoie, France

[73] Assignee: Framatome, Courbevoie, France

[21] Appl. No.: 131,629

[22] Filed: Oct. 5, 1993

[30] Foreign Application Priority Data

Oct. 5, 1992 [FR] France ................. 92 11764

[51] Int. Cl.⁶ .................................................. G21C 1/04
[52] U.S. Cl. .................................... 376/353; 376/234
[58] Field of Search ................. 376/353, 233, 234; 976/DIG. 129

[56] References Cited

U.S. PATENT DOCUMENTS

| | | | |
|---|---|---|---|
| 3,977,939 | 8/1976 | Frisch | 376/263 |
| 4,427,621 | 1/1984 | Gillett et al. | 376/260 |
| 4,752,434 | 6/1988 | Savary | 376/233 |
| 4,752,438 | 6/1988 | Desfontaines et al. | 376/285 |
| 5,006,305 | 4/1991 | Denizou | 376/353 |
| 5,106,572 | 4/1992 | Chevereau | 376/353 |
| 5,110,536 | 5/1992 | Chevereau | 376/285 |
| 5,183,628 | 2/1993 | Baujat et al. | 376/353 |

FOREIGN PATENT DOCUMENTS

| | | |
|---|---|---|
| 188163 | 12/1985 | European Pat. Off. |
| 266593 | 10/1987 | European Pat. Off. |
| 456562 | 5/1991 | European Pat. Off. |
| 467093 | 6/1991 | European Pat. Off. |
| 2591018 | 5/1987 | France |

*Primary Examiner*—Daniel D. Wasil
*Assistant Examiner*—Meena Chelliah
*Attorney, Agent, or Firm*—Pollock, Vande Sande & Priddy

[57] ABSTRACT

Internal equipments located above the core of a nuclear reactor have a bottom plate formed with outlet openings for the core coolant, a top plate, spacer columns interconnecting the plates, and guides for control clusters that are vertically displacable between a position in which they are in the core and a position in which they are out of the core. At least some guides each have a top length projecting above the top plate, and a bottom length extending between the plates and placed in a corresponding spacer column. Each cluster guide constitutes a cartridge insertable in a respective column, provided with a flange for fixing to the top plate and provided at its bottom end with springs for centering the guide within the column.

11 Claims, 6 Drawing Sheets

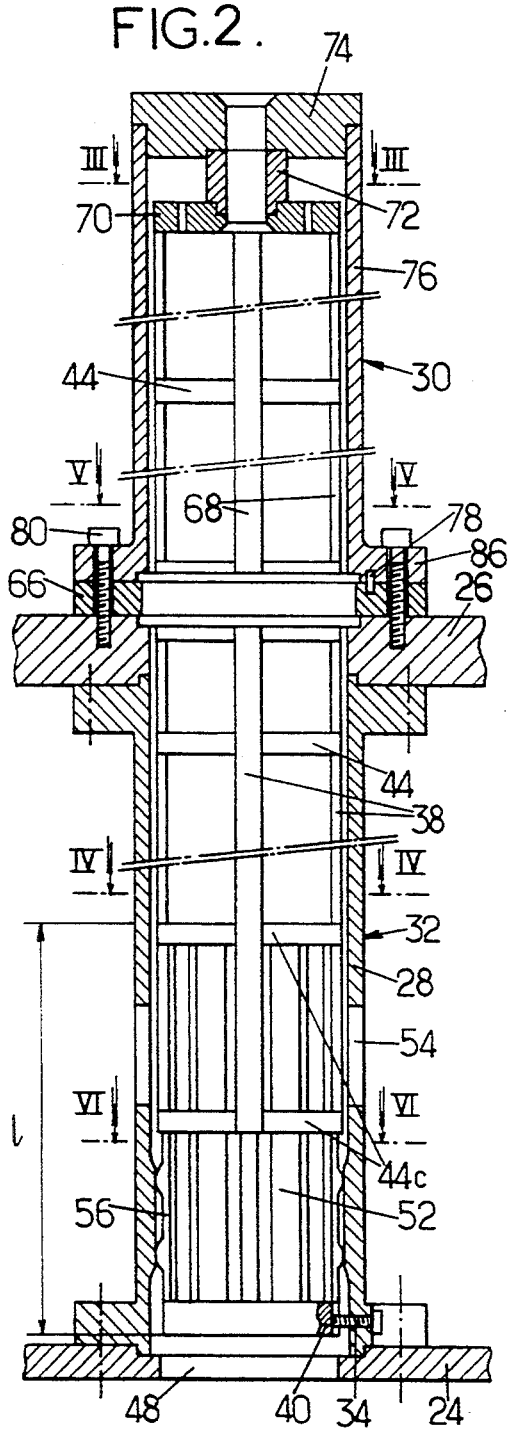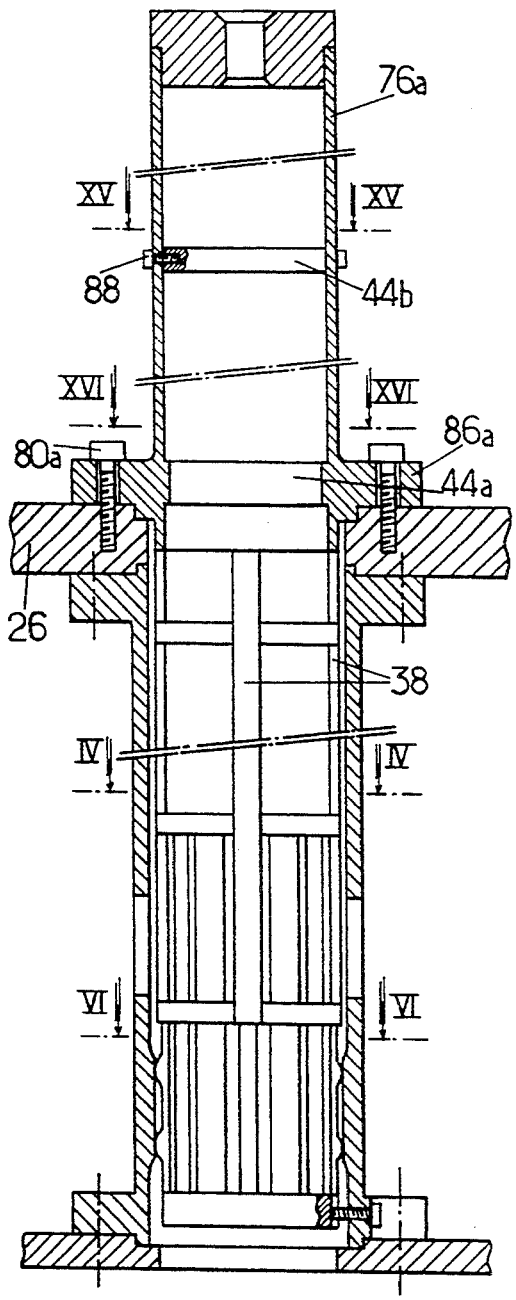

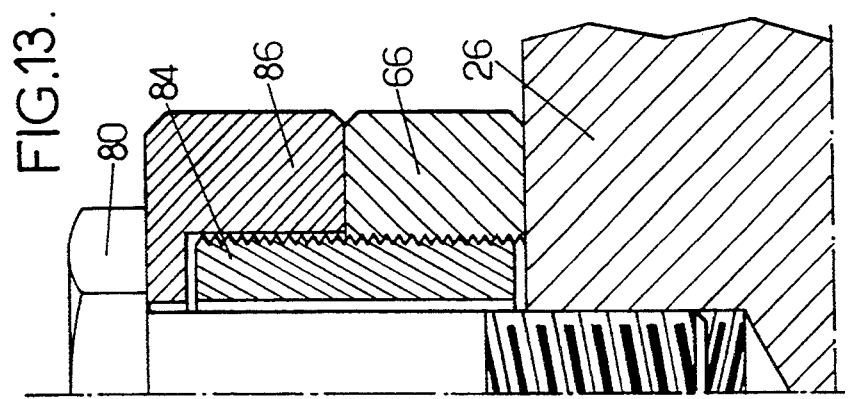
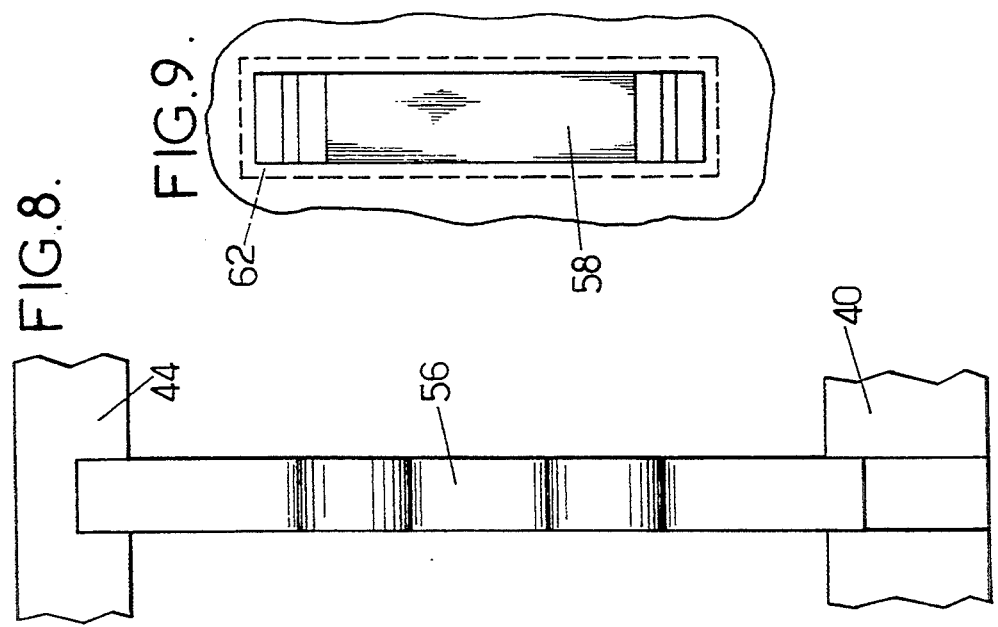
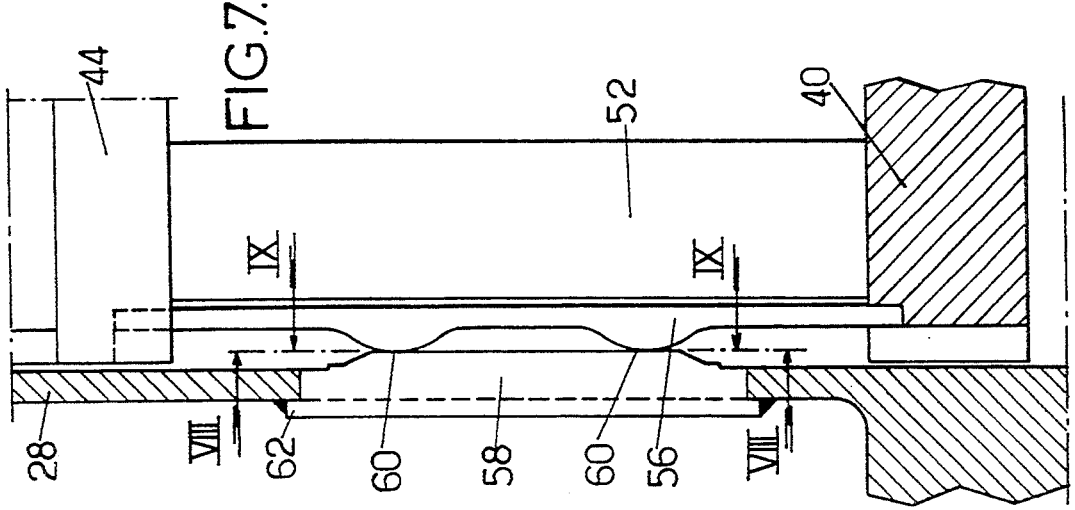

INTERNAL EQUIPMENT FOR A NUCLEAR REACTOR HAVING CONTROL CLUSTER GUIDES

BACKGROUND OF THE INVENTION

The present invention relates to upper internal equipments for a nuclear reactor, and it is particularly applicable to reactors that are cooled and moderated by pressurized water.

More particularly, it relates to internal equipments located above the core of a nuclear reactor, the equipment comprising a bottom plate formed with openings allowing coolant to leave the core, a top plate, spacer columns interconnecting the plates, and cluster guides for control clusters that are vertically displaceable between a lower position in which they are inserted in the core and an upper position in which they are out of the core, at least some of the guides each having an upper length that projects above the top plate and a bottom length that extends between the plates and that is within a respective spacer column.

In general, the top length of each cluster guide includes a tube along which cross plates are distributed for guiding individual rods, and the bottom lengths include split tubes each allocated to one rod and sleeves each allocated to two rods.

Equipments of this kind are described, for example, in U.S. Pat. No. 5,183,628.

SUMMARY OF THE INVENTION

It is an object of the present invention to provide equipments enabling cluster guides placed in columns to be installed and replaced simply.

To this end, in equipments of the type defined above, each of the cluster guides constitutes a cartridge insertable in a respective column, provided with a flange for connection to the top plate and provided at its bottom end with resilient means for centering it within the column.

In general, the bottom length of the guide will include a plurality of vertical (longitudinal) members connecting the connection flange to cross plates for guiding the cluster rods, split guide tubes, and sleeves for the rods in the lowest portion of the bottom length. The resilient means can then be constituted by longitudinal spring blades extending vertically and uniformly distributed angularly; for example, the spring blades may constitute the end portions of at least some of the longitudinal members, may be disposed between them, or may be disposed in line with them if they terminate before the bottom. These means may even be spring blades secured in a guide base and projecting upwards.

In a first embodiment, the top length of the guide is similar in structure to the bottom length; above the columns the upper internal equipments include casings fixed to the top plate and each enclosing one of the top lengths. In another embodiment, each top length constitutes such a casing.

BRIEF DESCRIPTION OF THE DRAWINGS

The invention will be better understood from the following description of particular embodiments given as examples. The description refers to the accompanying drawings.

FIG. 2 is a cross-sectional view on line II—II of FIGS. 3 to 6 showing, on a larger scale, a guide device constituting an embodiment of the invention and applicable to the reactor of FIG. 1;

FIG. 7 is a detail view on a larger scale of a fraction of the bottom portion of FIG. 2, in cross-section on line II—II of FIG. 6;

FIGS. 8 and 9 are respectively a view of the resilient spring blades in a particular embodiment, shown in cross-section along line VIII—VIII of FIG. 7, and a view of a thrust shoe as seen on line IX—IX of FIG. 7;

FIG. 13 is a detail view on a larger scale showing one possible embodiment of means for mutually connecting the top length of the guide and the casing;

FIG. 14 is similar to FIG. 2 and shows a modified embodiment; and

DETAILED DESCRIPTION OF PREFERRED EMBODIMENTS

Figure 1:
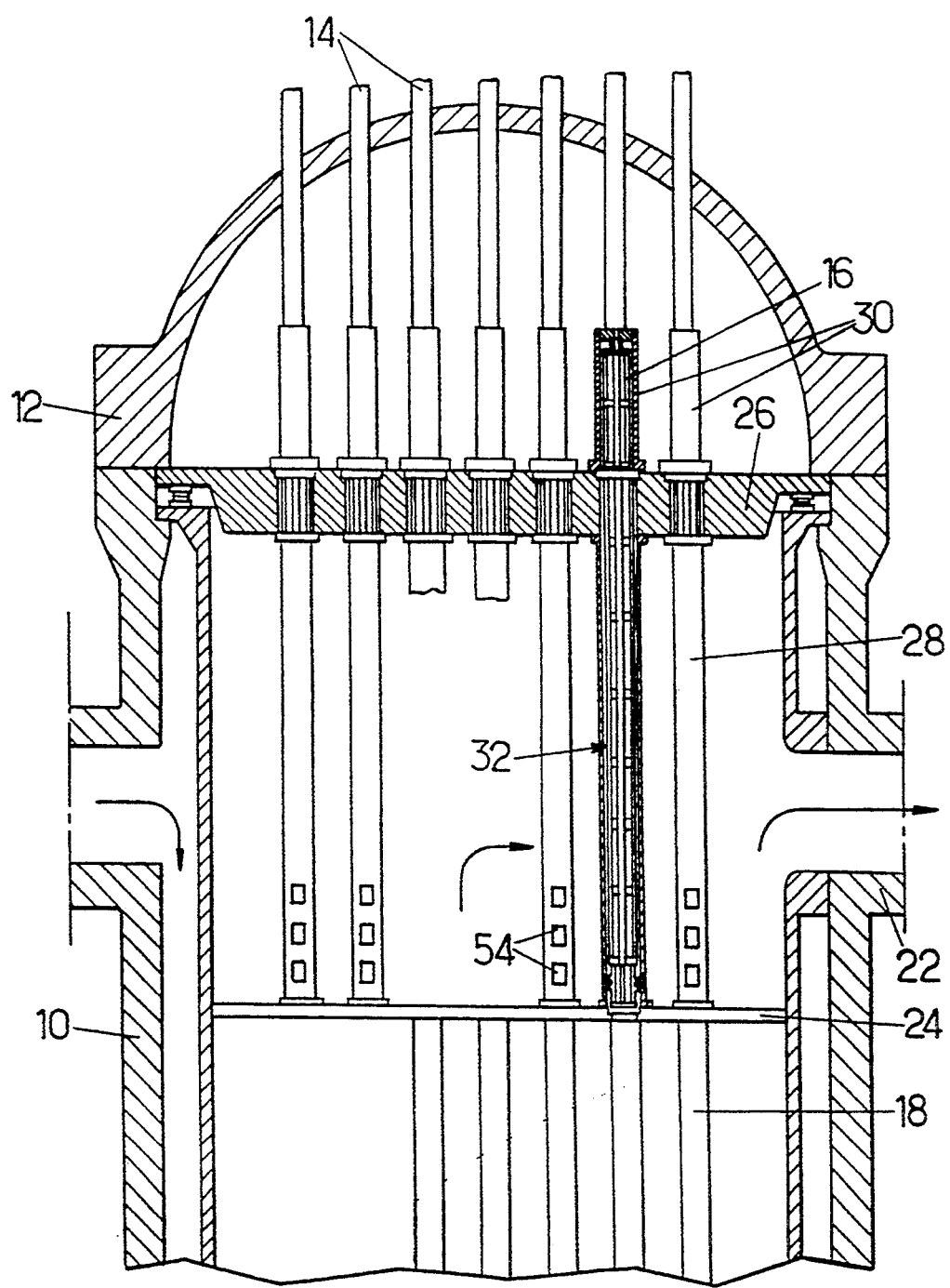
FIG. 1 is a simplified view in cross-section on a vertical plane showing the top portion of a reactor to which the invention may be applied.
Figure 3:
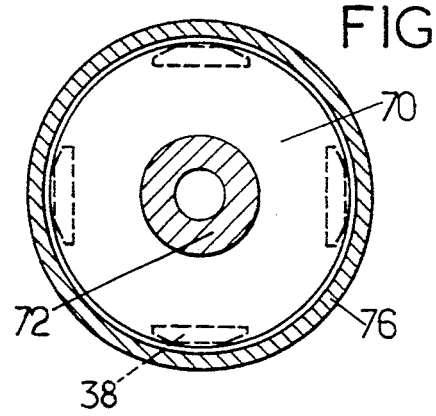
FIGS. 3 to 6 are cross-sectional views on lines III—III, IV—IV, V—V and VI—VI of FIG. 2.

By way of example, the invention is described in its application to a pressurized water reactor of the kind shown in FIG. 1, which reactor comprises a vessel 10 that withstands the pressure of the water which constitutes both the coolant and the moderator. The vessel is closed by a cover 12 which carries mechanisms 14 for displacing the control clusters, only one of which, 16, is shown in detail. The vessel 10 contains the core 18 which is built up by juxtaposing assemblies each of which comprises a framework and a bundle of fuel rods that are distributed in a regular array. The framework of each assembly comprises guide tubes (not shown) in which absorbent rods belonging to the control clusters can slide.

The core is surmounted by a structure, e.g., a welded structure, which is designated by the term "upper internal equipments". This structure performs several functions. It collects the flow of high temperature water leaving the core upwardly and it deflects it to the outlet nozzle 22 from the vessel 18. Finally, it guides the vertical displacement of the control clusters 16 associated with at least some of the assemblies.

The upper internal equipments shown in FIG. 1 comprise a bottom plate 24 which receives thrust from the assemblies subjected to the upward flow of pressurized water, and a top plate 26 which conveys the resultant of the forces applied to the upper internal equipment overall to the vessel 10 and to its cover 12. The plates 24 and 26 are interconnected by tubular spacer columns 28.

Cluster guides are provided vertically each in line with a mechanism 14. Each cluster guide may be considered as comprising a top length 30 and a bottom length 32. The bottom lengths 32 are contained in respective spacer column 28. The top lengths project above the top plate 26, which may be regarded as being a support plate for the cluster guides.

Together, the two lengths constitute a one-piece cartridge which is insertable as a whole by lowering it into a column. The cartridge has a framework that terminates at the bottom in a base 40 provided with indexing means for imparting a predetermined angular position to the framework in the column, such position being determined by a peg 34.

The framework comprises:

a plurality of (vertical) longitudinal members or beams 38 that are uniformly distributed angularly, and that are four in number, for example;

a plurality of regularly distributed cross plates or "cards" 44 which are cut out for their openings to match the distribution of neutron absorbent rods in the control cluster, and which are interconnected by the longitudinal members 38; and a transition flange 66 for connection to the top plate 26 (against the upwardly facing face of the plate 26 in the example shown in FIG. 2).

As shown, the lowest cross plate 44 and the base 40 are interconnected by split tubes and sleeves 52 for guiding the rods of the cluster, for protecting the rods against the flow of coolant, and for replacing the longitudinally extending members between the lowest plate 44c of the plates 44 and the base 40. These split tubes and sleeves provide continuous guidance for the rods of the cluster over a length 1 (FIG. 2). In contrast, the rods are guided discontinuously in that portion of the bottom length which is not provided with the split tubes and sleeves, and also in the top length.

Still in the embodiment shown in FIG. 2, each of the support columns 28 disposed around a bottom length 32 is terminated by flanges, one of which is fixed to the downwardly facing face of the top plate 26 and the other of which is fixed to the bottom plate 24, e.g., by means of screws The reactor is designed so that the coolant leaving the assemblies passes through passages 48 that are formed through the plate 24, each in alignment with one of the assemblies, and through the bases 40, where openings 54 are provided at the bottom ends of the columns.

Each bottom length 32 of a cluster guide in accordance with the invention is connected to the respective column by resilient centering means for centering the bottom portion of the length (and in some cases for centering an intermediate portion), and by indexing means.

In the example shown in FIG. 2, the indexing means form a sliding key system between the base 40 and the column 28, and are constituted by a peg 34 which engages in a vertical groove in the base 40.

A wide range of structures can be used for the resilient centering means.

In the embodiments which are illustrated by way of examples, they comprise longitudinal resilient spring blades disposed vertically and uniformly distributed angularly, which blades extend between the lowest cross plate 44c and the base 40. As shown, the spring blades are disposed in line with the longitudinal members 38 and they are radially in alignment with the sleeves for guiding pairs of rods at a time. However, that is not the only possible disposition.

The means shown in FIGS. 2, 7, 8, and 9 comprise four resilient spring blades 56 fixed to the bottom length and respective thrust shoes 58 mounted on the spacer column 28. The respective ends of each blade 56 are received firstly in the lowest cross plate 44c and secondly in the base 40. To this end, the ends of the blades may be welded in notches. FIG. 7 shows that the blade 56, under the effect of a horizontal force, can deform until its central portion comes into contact with and bears against the sleeve 52, thus constituting an abutment limiting lateral displacement of the cartridge. The deformable portion of each spring blade 56 has two bulges 60 that bear against a corresponding shoe 58.

The shoe may be mounted in slots or grooves of the spacer column 28 and may have a rear rim 62 welded against the outside wall of the spacer column 28.

Figure 10:
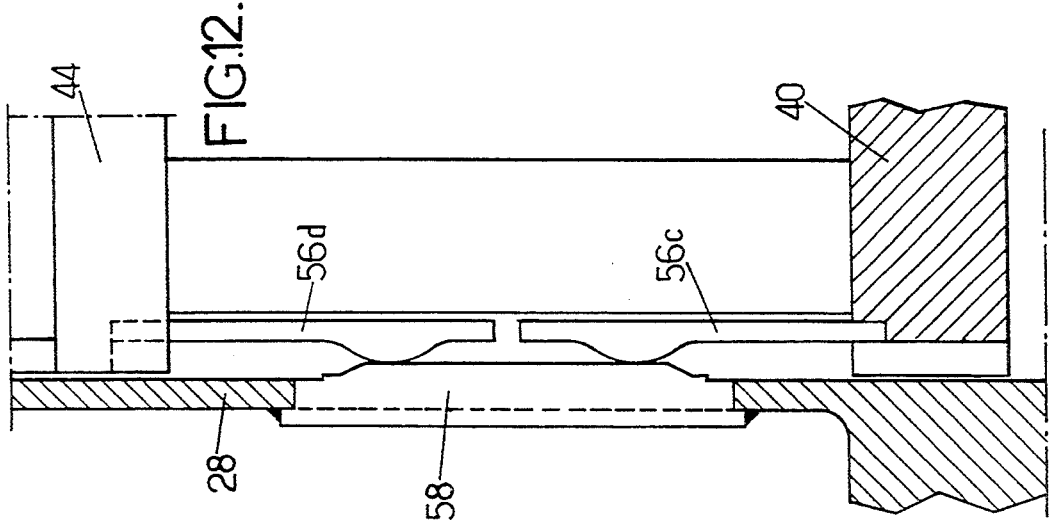
FIGS. 10, 11, and 12 are similar to FIG. 7 and show modified embodiments.

In the embodiment shown in FIG. 10, where members that correspond to members shown in FIG. 7 are given the same reference numerals, the flexible spring blade 56a is again received at both ends respectively in the lowest plate 44c and in the base 40, however its cross-section is different, being in the form of a highly flattened triangle having a culminating flash 64 that bears against the shoe 58.

Figure 11:
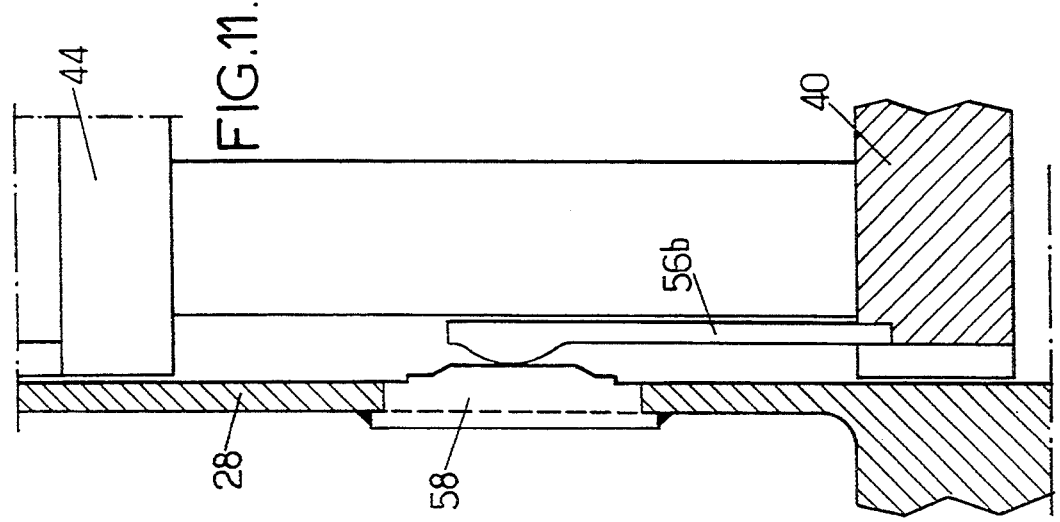

In the example shown in FIG. 11, the resilient spring blades 56b are received solely in the base 40 and are cantilevered out therefrom.

Figure 12:
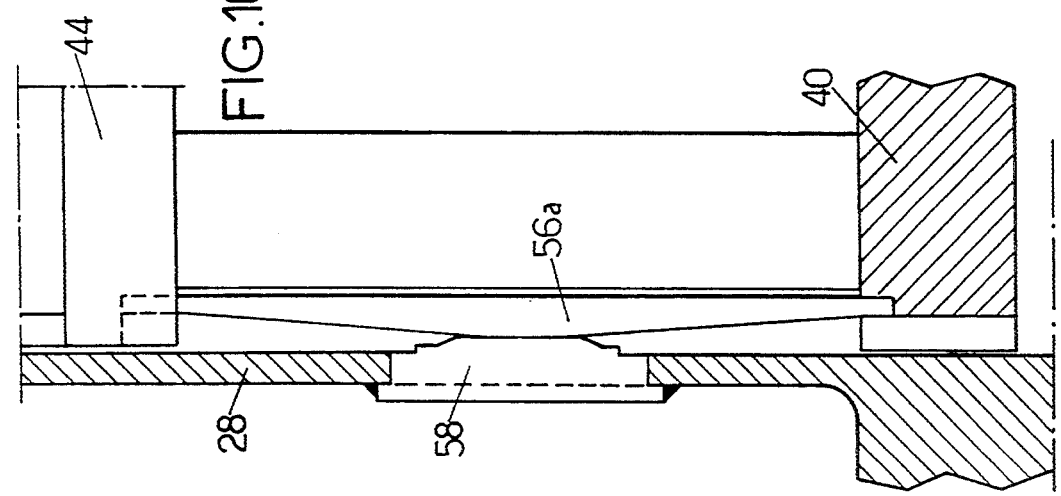

Finally, in the embodiment shown in FIG. 12, the resilient means comprise two sets of spring blades. The blades 56c in one set are received in the base 40. The blades 56d in the other set are received in the lowest cross plate 44c. The blades 56c and 56d may be disposed symmetrically and each may be provided with a single bulge for bearing against the shoe 58.

Resilient guide means of the same kind as those shown in FIGS. 7 to 12 may also be placed on other cross plates 44 so as to provide guide means that is distributed along the bottom length.

Figure 4:
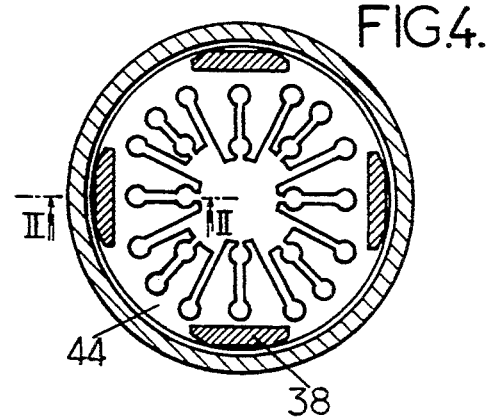
Figure 5:
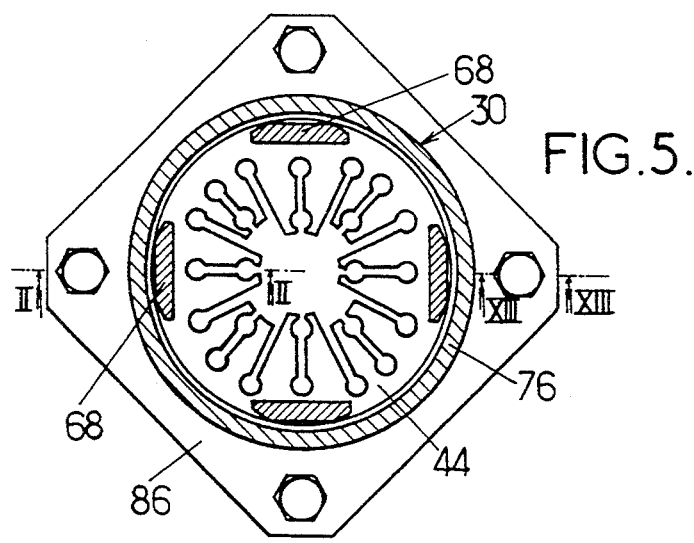
Figure 6:
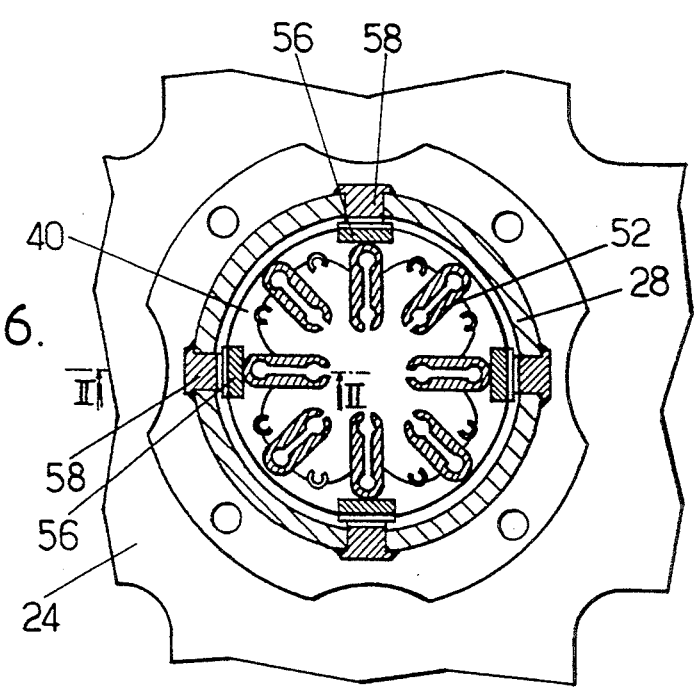

All of the dispositions described above can be used not only in the embodiment shown in FIG. 2, but also in that shown in FIG. 14 where the bottom length is therefore not described again. FIGS. 4 and 6 may consequently be considered equally as being cross-sections at levels IV—IV and VI—VI of FIG. 14 as at the corresponding levels in FIG. 2.

In contrast, the top length of the embodiment shown in FIG. 2 is different from that shown in FIG. 14.

In the example in FIG. 2, the top length is connected to the bottom length so as to constitute a one-piece structure by means of a transition coupling 66 for pressing against the top face of the top plate 26. Length members 68 are disposed in line with the length members 36 and likewise interconnect the plates 44c and connect them to a top plate 70 provided with a centering means 72. The centering means are designed to engage in a reception plate 74 belonging to a casing 76 fixed to the transition coupling 66 and to the top plate 26.

The means for fixing the casing to the transition coupling may have various different dispositions. In the example shown in FIG. 2, the casing is centered on the coupling 66 by one or more orienting pegs 78 and screws 80 which simultaneously fix the transition coupling and the flange of the casing onto the plate 26. It may nevertheless be more advantageous to fix the flange and the coupling together before installing an integrated casing and cluster-guide structure. For this purpose, it is possible to use the disposition shown in FIG. 13, which includes threaded sleeves 84 having a head bearing against a shoulder on the flange 86 of the casing and a threaded portion for screwing into a threaded opening in the transition coupling 66. The fixing screws 80 engage in the plate 26 then pass through a smooth bore provided in the sleeve 84.

Figure 15:
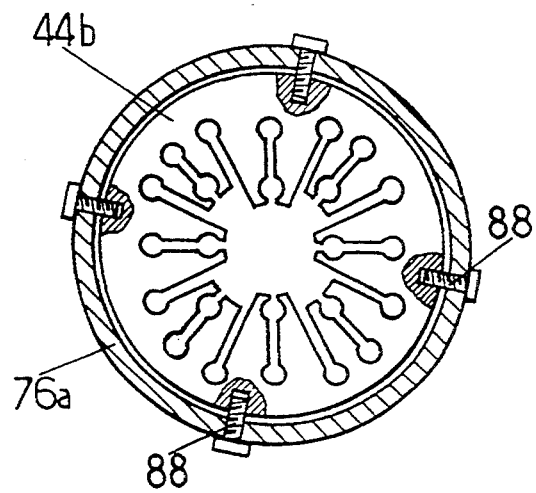
FIGS. 15 and 16 are cross-sectional views on lines XV—XV and XVI—XVI of FIG. 14.

In the embodiment shown in FIG. 14, the casing 76a is integrated in the cluster guide. In this case, the ends of the longitudinal members 38 are level with a cross plate 44a that replaces the transition coupling. The cross guide plates 44b provided in the top length are directly fixed on the side wall of the casing 76a, e.g., by means of screws or of fitted pegs 88, as shown in FIGS. 14 and 15.

Figure 16:
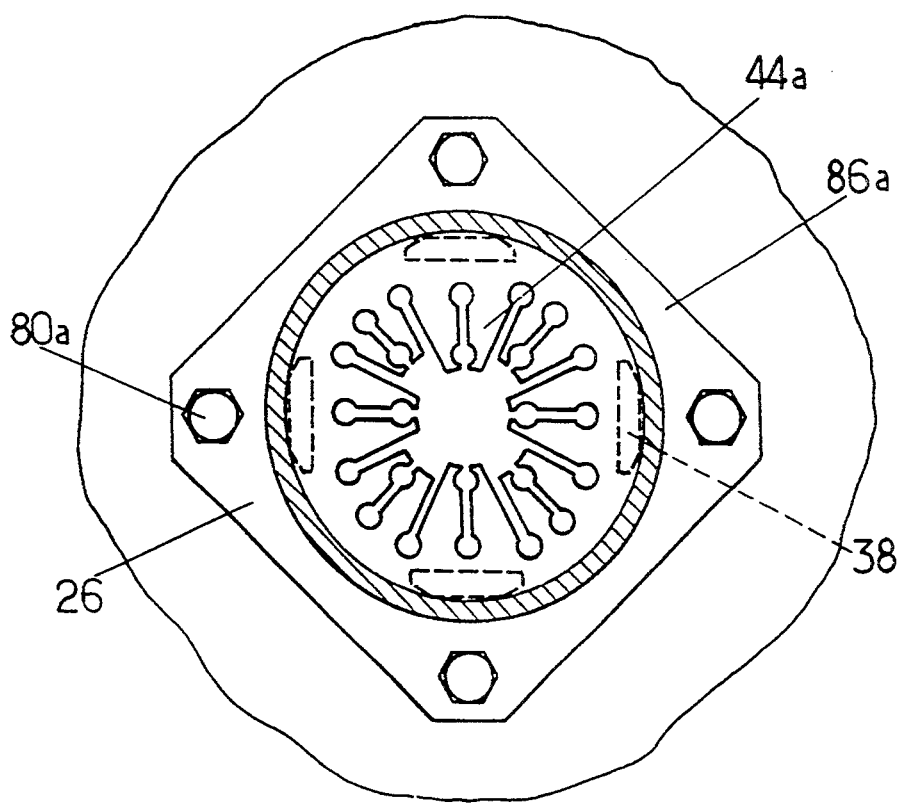

In this case, the cluster guide structure may be fixed by means of the casing flange 86a using screws 80a that engage directly in the plate 26 (FIGS. 14 and 16).

Regardless of the embodiment chosen, it can be seen that the cluster guide can be accurately positioned inside a spacer column while still providing a high degree of flexibility in installation and removal. When the cartridge is lowered inside the spacer column, the spring blades which, at rest, project far enough to interfere with insertion, bend when they come into contact with the shoes. The resilient thrust provided by the spring blades cooperates with the abutment thrust of the rear of the blade against the bush in the event of violent shocks, e.g., during an earthquake. Finally, a cluster guide of the invention can easily replace a cluster guide in an existing reactor that is provided with spacer columns.

I claim:

1. In a nuclear reactor having a core, internal equipments located above said core and having:
   a bottom plate formed with outlet openings for circulation of coolant flowing out of the core;
   a top plate;
   a plurality of vertical spacer columns interconnecting said top plate and said bottom plate; and
   a plurality of guides each for receiving a cluster of control rods vertically displaceable between a position in which it is inserted in the core and a position in which it is out of and above the core, at least some of said guides each having a top length projecting above the top plate, and a bottom length extending between the plates and placed in a respective one of said spacer columns,
   wherein each of said guides constitutes a cartridge insertable as a whole in a respective column, is provided with flange means for connection with the top plate and is provided at its bottom end with resilient means for centering said bottom end within the respective column.

2. Equipments according to claim 1, wherein at least the bottom length of each of said some of said guides includes a plurality of vertical longitudinal members connecting said flange means to a plurality of cross plates for guiding the control rods of the respective cluster, and said bottom length includes a plurality of vertical split sleeves and tubes for guiding the rods in a lower portion thereof.

3. Equipments according to claim 2, wherein the top length of each guide has the same structure as its bottom length, and said upper equipments further include, above the columns, respective casings fixed to the top plate and each enclosing one of said top lengths.

4. Equipment according to claim 3, wherein the top length of each said guide is connected to the bottom length to constitute a one-piece structure by means of a transition coupling and constructed to bear against an upper face of the top plate, and said longitudinal members are disposed in line with the length members of the bottom length and interconnect the cross guide plates of the top length and also connect them to a top plate provided with centering means designed to engage in a reception plate belonging to the casing.

5. Equipment according to claim 2, wherein the top length includes a casing fixed to the top plate and in which discontinuous cross guide plates are fixed.

6. Equipment according to claim 2, wherein the resilient means are constituted by longitudinally extending resilient spring blades that are uniformly distributed angularly, disposed between the length members of the bottom length or in alignment therewith.

7. Equipment according to claim 6, wherein a plurality of thrust shoes each for engaging one of the spring blades are fixed to each spacer column.

8. Equipment according to claim 6, wherein one of the ends of each of said resilient spring blades is engaged in a lowermost of said cross plate, and the other end thereof is engaged in a base of the bottom length.

9. Equipment according to claim 6, wherein the spring blades of a first set are engaged in a base of the bottom length, and the spring blades of another set are engaged in the lowermost cross guide plate, each of the spring blades being provided with an own thrust bulge.

10. Equipment according to claim 2, wherein the resilient means have an amount of deflection which is limited by contact of the rear face of the resilient spring blade with a respective one of said sleeves.

11. In a nuclear reactor having a core internal equipments located above said core and having:
   a bottom plate formed with outlet openings for circulating coolant flow out of the core;
   a top plate;
   a plurality of vertical spacer columns interconnecting said top plate and said bottom plate;
   a plurality of guides, each for receiving a cluster of control rods vertically displaceable between a position in which it is inserted in the core and a position in which it is out of and above the core, at least some of said guides each having a top length projecting above the top plate, and a bottom length extending between the plates and placed in a respective one of said spacer columns; and
   a plurality of casings located above the top plate, each fixed to said top plate and each closing one of said top lengths;
   wherein each of said some of said guides constitutes a cartridge insertable as a whole in a respective spacer column, the top length of said guide has flange means for connection with the top plate and the bottom length of said guide is provided at its lower end with resilient means for resiliently centering said lower end within the respective spacer column.

* * * * *